W. J. KERR & T. HODGSON.
PIPE UNION.
APPLICATION FILED FEB. 24, 1912.
1,167,572.
Patented Jan. 11, 1916.
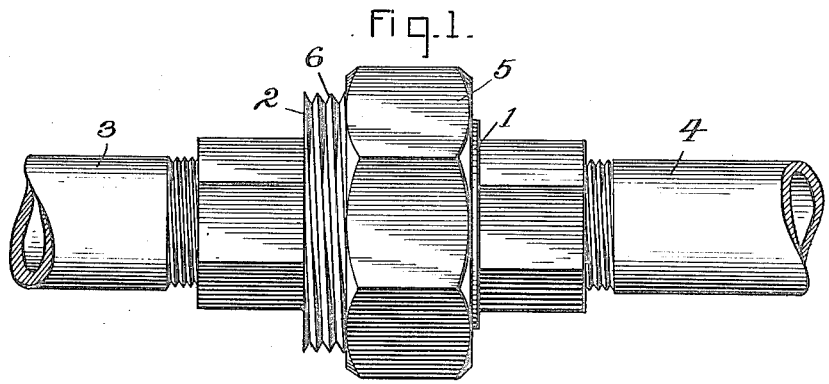
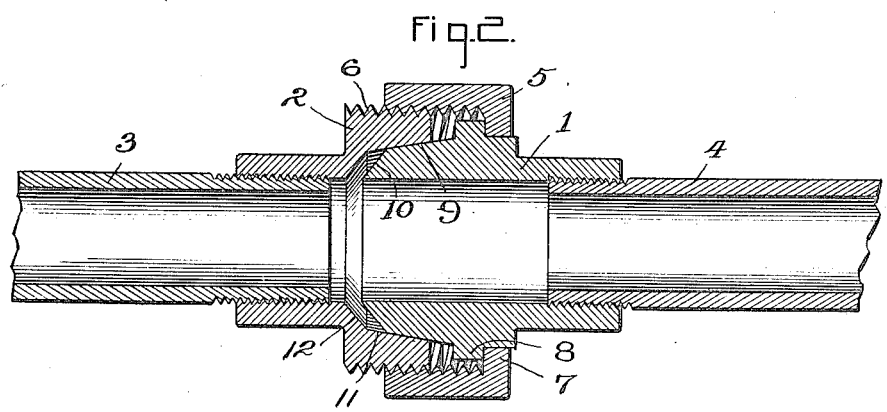
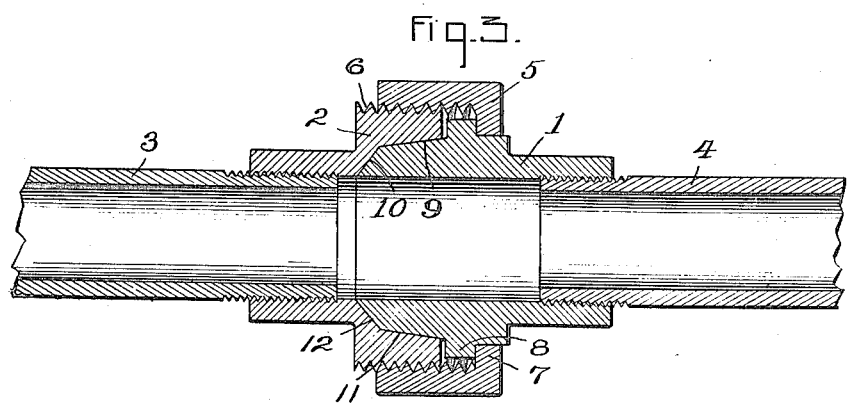
WITNESSES
W. Ray Taylor
Leroy S. Hodges
INVENTORS
William J. Kerr,
Thomas Hodgson,
by Geyer & Popp
ATTORNEYS

UNITED STATES PATENT OFFICE.

WILLIAM J. KERR AND THOMAS HODGSON, OF BUFFALO, NEW YORK.

PIPE-UNION.

1,167,572.  Specification of Letters Patent.  Patented Jan. 11, 1916.

Application filed February 24, 1912. Serial No. 679,687.

*To all whom it may concern:*

Be it known that we, WILLIAM J. KERR and THOMAS HODGSON, citizens of the United States, and residents of Buffalo, in the county of Erie and State of New York, have invented new and useful Improvements in Pipe-Unions, of which the following is a specification.

This invention relates to the class of pipe-joints or unions comprising male and female members secured to the ends of the pipe sections and a coupling-nut for tightly drawing said members together. The joint is designed more particularly for the air and steam pipes of locomotives, but is generally useful as a pipe joint.

The object of our invention is to prolong the life of such pipe-unions without increasing their cost or complicating their construction.

In the accompanying drawings: Figure 1 is a side elevation of a pipe-union embodying the invention. Figs. 2 and 3 are longitudinal sections thereof, showing different stages or adjustments of the joint.

Similar characters of reference indicate corresponding parts in the several views.

1 indicates the male member of the union, 2 the female member, and 3, 4 the pipes to which said members are secured, preferably by the customary screw-threaded joint, as shown. The members 1 and 2 are united and tightly drawn together by the usual coupling nut 5 or other suitable means. In the construction shown, the screw thread of the nut engages an external thread 6 of the female member, and the inwardly-turned lip or flange 7 of the nut overlaps a projecting flange 8 of the male member. In order to lengthen the life of the joint, the male and female members are provided with a plurality of coöperating bearing or contact surfaces each pair or set of which is adapted and constructed to come into service when the preceding pair becomes worn out or inoperative. In the preferred construction illustrated in the drawings, the male member is provided with two such joint-surfaces 9 and 10 arranged one beyond the other. The surface 9 is the initial or primary one and formed by tapering or beveling the male member at a comparatively small angle from its flange 8 to a point short of its front end, say an angle of about 10 degrees, while the surface 10, which is the secondary one, is formed by beveling the end of said member at a greater angle than that of the primary joint-surface 9, say an angle of about 50 degrees. The female or socket member 2 is provided with complementary primary and secondary bearing-surfaces 11 and 12 tapered and beveled to correspond to the angles of the surfaces 9 and 10 of the male member, as shown. The surfaces 9 and 11 are preferably ground, while the surfaces 10 and 12 are turned, to form air and steam-tight joints.

The surfaces 9 and 11 constituting the primary joint are originally made of such a diameter that when they are tightly forced together, the surfaces 10 and 12 constituting the secondary joint remain inoperative or separated more or less, as shown in Fig. 2. This is the condition of the joint when first put into use, and for some time thereafter. By repeated tightening of the coupling nut 5 to take up wear of the joint, the adjusting or wedging range of the initial surfaces 9 and 11 finally becomes exhausted, and the moment this occurs the secondary joint surfaces 10 and 12 are tightly drawn against each other and brought into service, as shown in Fig. 3, thus maintaining a tight joint for a further period of time and correspondingly prolonging the life of the pipe-union. No additional parts are employed to attain this desirable result and the cost of the joint is therefore no greater than that of an ordinary pipe-union having but a single pair or set of joint-surfaces. Moreover, the use of rubber gaskets and similar short-lived packings which deteriorate from exposure to the action of steam and other fluids is also avoided, a tight and reliable joint being formed by the rigid beveled faces of the joint-members.

Owing to the reliability and durability of this improved union, it is especially desirable for the air and steam pipes and nipples of locomotives, but it is equally applicable to other pipes or conduits.

We claim as our invention:

A pipe-union, comprising male and female members and means for coupling and tightening the same, said male and female members having coöperating primary and secondary joint-surfaces arranged one beyond the other, the joint-surfaces of both pairs being beveled and rigid, the secondary joint-surfaces being beveled at a greater angle than said primary surfaces and the diameter of said primary surfaces being such as to separate the coöperating secondary surfaces in the initial condition of the union.

Witness our hands this 21st day of February, 1912.

WILLIAM J. KERR.
THOMAS HODGSON.

Witnesses:
C. F. GEYER,
E. M. GRAHAM.